(12) United States Patent
Shiiyama

(10) Patent No.: US 8,019,195 B2
(45) Date of Patent: Sep. 13, 2011

(54) MOVING IMAGE PLAYBACK APPARATUS AND METHOD WITH SEARCH CAPABILITY

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1493 days.

(21) Appl. No.: 10/207,220

(22) Filed: Jul. 30, 2002

(65) Prior Publication Data

US 2003/0026594 A1 Feb. 6, 2003

(30) Foreign Application Priority Data

Aug. 3, 2001 (JP) ................................. 2001-236899

(51) Int. Cl.
*H04N 9/80* (2006.01)
(52) U.S. Cl. ........................................ 386/241; 386/248
(58) Field of Classification Search .................. 725/112, 725/38, 39, 40; 386/350, 241, 126, 46, 125
See application file for complete search history.

(56) References Cited

U.S. PATENT DOCUMENTS

| | | | |
|---|---|---|---|
| 5,134,499 A * | 7/1992 | Sata et al. | 386/109 |
| 5,157,511 A | 10/1992 | Kawai et al. | 358/335 |
| 5,177,618 A * | 1/1993 | Dunlap et al. | 386/94 |
| 5,459,830 A * | 10/1995 | Ohba et al. | 345/473 |
| 5,657,434 A | 8/1997 | Yamamoto et al. | |
| 5,835,667 A * | 11/1998 | Wactlar et al. | 386/96 |
| 5,930,446 A * | 7/1999 | Kanda | 386/282 |
| 6,072,479 A * | 6/2000 | Ogawa | 707/104.1 |
| 6,247,009 B1 | 6/2001 | Shiiyama et al. | 707/3 |
| 6,317,141 B1 * | 11/2001 | Pavley et al. | 715/732 |
| 6,334,025 B1 * | 12/2001 | Yamagami | 386/96 |
| 6,371,141 B1 * | 4/2002 | Lin et al. | 135/28 |
| 6,400,853 B1 | 6/2002 | Shiiyama | 382/305 |
| 6,590,585 B1 * | 7/2003 | Suzuki et al. | 715/719 |
| 6,973,669 B2 * | 12/2005 | Daniels | 725/112 |

FOREIGN PATENT DOCUMENTS

| | | |
|---|---|---|
| JP | 7-296445 | 11/1995 |
| JP | 08-161522 A | 6/1996 |
| JP | 3058333 | 4/2000 |
| JP | 2000312333 A | 11/2000 |

OTHER PUBLICATIONS

U.S. Appl. No. 09/122,700, filed Jul. 27, 1998, by Ohdate, T., et al.
U.S. Appl. No. 09/298,960, filed Apr. 26, 1999, by Shiiyama, H.

* cited by examiner

*Primary Examiner* — Jamie Atala
(74) *Attorney, Agent, or Firm* — Fitzpatrick, Cella, Harper & Scinto

(57) ABSTRACT

A moving image playback apparatus plays back moving image data, and synchronously displays a thumbnail image sequence obtained from the moving image data. In this state, when a cursor used to designate a thumbnail image falls within a predetermined area including the display area of the thumbnail image, synchronous display of the thumbnail image sequence is interrupted. When a thumbnail image is designated by the cursor, the playback position jumps to a corresponding scene to start playback of the moving image, and synchronous display of the thumbnail image sequence is restarted. When the thumbnail image sequence has been scrolled in the time-axis direction, synchronous display of the thumbnail image sequence is interrupted, and an instruction interface used to instruct restart of synchronous display is provided. When the instruction interface is operated in this state, synchronous display of the thumbnail image sequence is restarted.

21 Claims, 13 Drawing Sheets

MOVING IMAGE PLAYBACK APPARATUS AND METHOD WITH SEARCH CAPABILITY

FIELD OF THE INVENTION

This invention relates to an image search apparatus and method.

BACKGROUND OF THE INVENTION

As described in Japanese Patent No. 3058333, a moving image search technique that displays index information of images as a thumbnail image sequence, and jumps the current playback position to an arbitrary scene in response to a user clicking a desired thumbnail image among them using a pointing device, is available. Also, as a recent video recorder that uses a hard disk (HD) as a storage medium, a product that effectively presents a thumbnail image sequence by automatically scrolling it in synchronism with the displayed moving image is available.

FIGS. 13A and 13B are views for explaining playback of a moving image or moving picture and display of a thumbnail image sequence. A moving image playback area 2000 plays back and displays a moving image, and a thumbnail image sequence 2001 displays thumbnail images corresponding to respective scenes of the moving image in line (in FIGS. 13A and 13B, five thumbnail images are displayed). In this example, thumbnail images are displayed for respective scenes obtained by delimiting a moving image at given time intervals. In FIG. 13A, the moving image playback area 2000 displays scene 20, and the thumbnail image sequence 2001 displays thumbnail images corresponding to scenes 18 to 22. Automatically scrolling the thumbnail image sequence in synchronism with the displayed moving image means switching the display contents of the thumbnail image sequence from scenes 18 to 22 to scenes 19 to 23 when the contents on the moving image playback area 2000 have reached scene 21.

When one image of the thumbnail image sequence 2001, e.g., a thumbnail image corresponding to scene 22, is designated by mouse operation or the like, a moving image corresponding to scene 22 is played back on the moving image playback area 2000.

By manually scrolling the thumbnail image sequence 2001, a thumbnail image sequence within a desired range can be displayed, as shown in, e.g., FIG. 13B. At this time, the synchronous operation is interrupted. In this way, when the playback position jumps to a scene far from the current scene as a result of the user clicking on a given thumbnail image, the user scrolls the thumbnail image sequence in the time-axis direction, and clicks a thumbnail image of a scene that he or she wants to review.

However, the user cannot often find any scene as a jump destination, and wants to continue to watch a moving image. In such case, however, the synchronous relationship between the moving image and thumbnail image sequence has collapsed upon scrolling the thumbnail image sequence. Since the conventional apparatus does not take sufficient measure to restore synchronous display, when the user wants to revert from the state shown in FIG. 13B to the synchronous state shown in FIG. 13A (synchronization between a moving image to be played back and thumbnail image sequence), he or she must manually scroll back the thumbnail image sequence.

Likewise, after the user has scrolled the thumbnail image sequence in the time-axis direction to preview scenes ahead of the current scene of this moving image, he or she wants to restore the display state of the thumbnail image sequence in synchronism with the moving image, playback of which is underway. However, a measure to realize such operation is not available.

Furthermore, when the user wants to make a jump to a desired scene by selecting a given thumbnail image from the thumbnail image sequence, while the thumbnail image sequence is automatically scrolled in synchronism with the displayed moving image, the contents of the thumbnail image sequence have been scrolled at a delicate timing, and the user may select a thumbnail image that he or she did not intend. This is also a problem posed upon displaying a thumbnail image sequence in synchronism with the displayed moving image.

SUMMARY OF THE INVENTION

The present invention has been made in consideration of the above problems, and has as its object to provide a pleasant operation environment upon playing back a moving image.

More specifically, it is an object of the present invention to allow the user easily to restore synchronous display of a thumbnail image sequence from a state wherein synchronization between the thumbnail image sequence and moving image playback is interrupted by, e.g., scroll operation of the thumbnail image sequence.

It is another object of the present invention to allow the user to designate a desired scene more reliably when the thumbnail image sequence is displayed by automatic scroll synchronized with playback of a moving image.

According to the present invention, the foregoing object is attained by providing a moving image search apparatus comprising: playback means for playing back moving image data; thumbnail image sequence display means for displaying a thumbnail image sequence corresponding to a plurality of scenes of the moving image played back by the playback means; playback control means for controlling the playback means to play back the moving image by jumping to a scene corresponding to a thumbnail image designated from the thumbnail image sequence; update means for updating display contents of the thumbnail image sequence in synchronism with playback of the moving image by the playback means to include a thumbnail image corresponding to a scene which is currently played back by the playback means; and inhibition means for inhibiting the updating means from updating the display contents of the thumbnail image sequence while a cursor used to designate a thumbnail image falls within a predetermined area including a display area of the thumbnail image sequence.

According to another aspect of the present invention, the foregoing object is attained by providing a moving image search apparatus comprising:

playback means for playing back moving image data; thumbnail image sequence display means for displaying a thumbnail image sequence corresponding to a plurality of scenes of the moving image played back by the playback means; playback control means for controlling the playback means to play back the moving image by jumping to a scene corresponding to a thumbnail image designated from the thumbnail image sequence; and update means for updating display contents of the thumbnail image sequence to include a thumbnail image corresponding to a scene played back by the playback means, when the thumbnail image sequence does not include the thumbnail image corresponding to the scene played back by the playback means.

According to still another aspect of the present invention, the foregoing object is attained by providing a moving image search apparatus comprising:

playback means for playing back moving image data; thumbnail image sequence display means for displaying a thumbnail image sequence corresponding to a plurality of scenes of the moving image played back by the playback means; update means for updating display contents of the thumbnail image sequence to include a thumbnail image corresponding to a scene currently being played back, so as to synchronize the display contents of the thumbnail image sequence with the moving image played back by the playback means; playback control means for controlling to start playback of the moving image by jumping to a scene corresponding to a thumbnail image designated from the thumbnail image sequence, and controlling the update means to start updating of the display contents of the thumbnail image sequence; scroll means for inhibiting an update process of the update means, and scrolling the display contents of the thumbnail image sequence in a time-axis direction in accordance with a predetermined operation; and restart control means for, when the scroll means inhibits execution of the update means, controlling to restart execution of the update means by detecting a predetermined operation state.

According to still another aspect of the present invention, the foregoing object is attained by providing a moving image search method comprising:

the playback step of playing back moving image data; the thumbnail image sequence display step of displaying a thumbnail image sequence corresponding to a plurality of scenes of the moving image played back in the playback step; the playback control step of controlling the playback step to play back the moving image by jumping to a scene corresponding to a thumbnail image designated from the thumbnail image sequence; the update step of updating display contents of the thumbnail image sequence in synchronism with playback of the moving image in the playback step to include a thumbnail image corresponding to a scene which is currently played back in the playback step; and the inhibition step of inhibiting the updating step from updating the display contents of the thumbnail image sequence while a cursor used to designate a thumbnail image falls within a predetermined area including a display area of the thumbnail image sequence.

According to still another aspect of the present invention, the foregoing object is attained by providing a moving image search method comprising:

the playback step of playing back moving image data; the thumbnail image sequence display step of displaying a thumbnail image sequence corresponding to a plurality of scenes of the moving image played back in the playback step; the playback control step of controlling the playback step to play back the moving image by jumping to a scene corresponding to a thumbnail image designated from the thumbnail image sequence; and the update step of updating display contents of the thumbnail image sequence to include a thumbnail image corresponding to a scene played back in the playback step, when the thumbnail image sequence does not include the thumbnail image corresponding to the scene played back in the playback step.

According to still another aspect of the present invention, the foregoing object is attained by providing a moving image search method comprising:

the playback step of playing back moving image data; the thumbnail image sequence display step of displaying a thumbnail image sequence corresponding to a plurality of scenes of the moving image played back in the playback step; the update step of updating display contents of the thumbnail image sequence to include a thumbnail image corresponding to a scene currently being played back, so as to synchronize the display contents of the thumbnail image sequence with the moving image played back in the playback step; the playback control step of controlling to start playback of the moving image by jumping to a scene corresponding to a thumbnail image designated from the thumbnail image sequence, and controlling the update step to start updating of the display contents of the thumbnail image sequence; the scroll step of inhibiting an update process of the update step, and scrolling the display contents of the thumbnail image sequence in a time-axis direction in accordance with a predetermined operation; and the restart control step of controlling, when execution of the update step is inhibited in the scroll step, to restart execution of the update step by detecting a predetermined operation state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS the preferred embodiments of the present invention will now be described in detail in accordance with the accompanying drawings.

First Embodiment

As a user interface for moving image search of this embodiment, a user interface which can interrupt synchronous display on a thumbnail image sequence with respect to a moving image currently being played back and allow the user to freely scroll or jump the thumbnail image sequence in response to a given user's operation, and can restart synchronous display on the thumbnail image sequence with respect to the moving image currently being played back in response to another given user's operation is provided.

<Overall Arrangement of Moving Image Search Apparatus>

Figure 1:
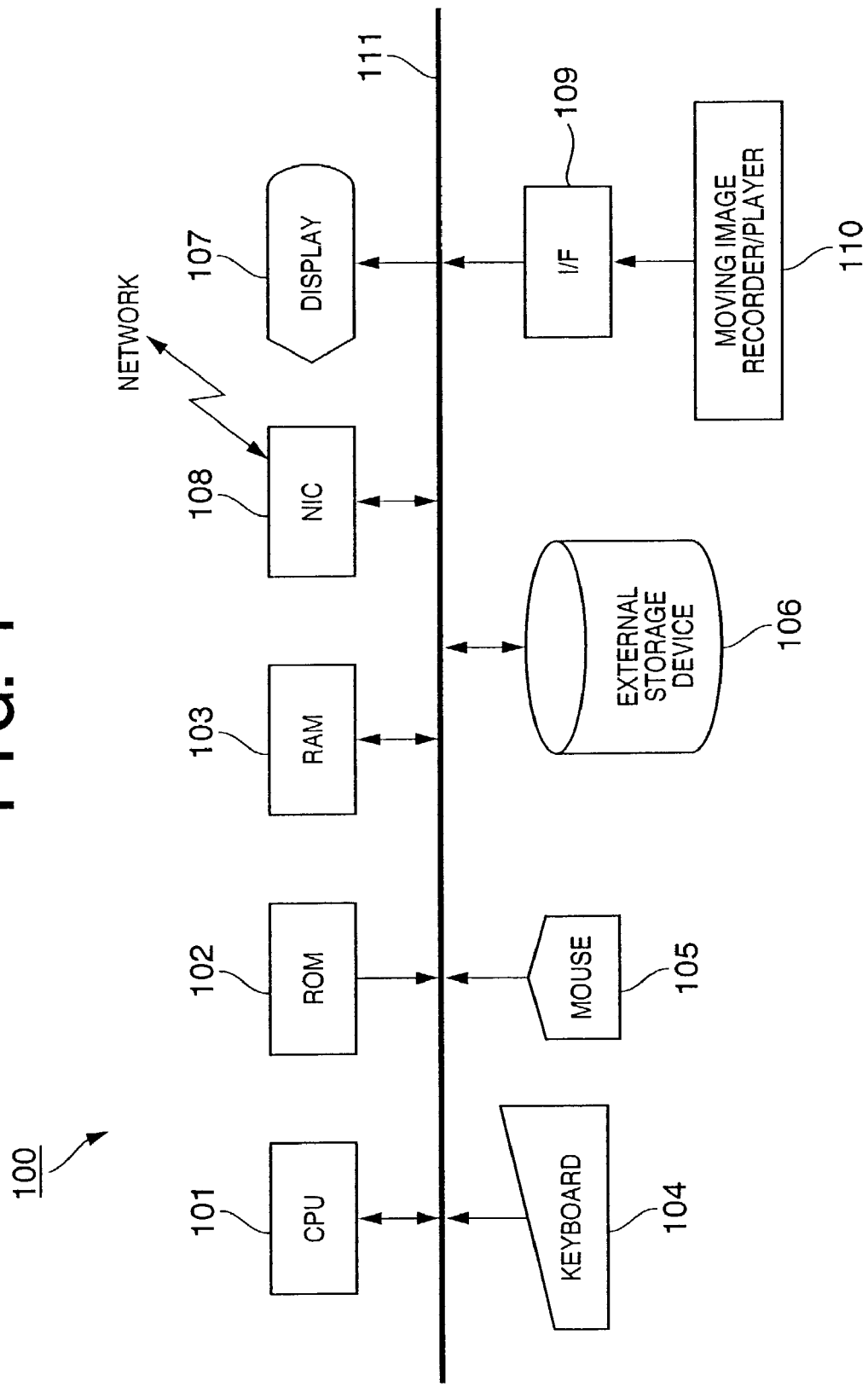
FIG. 1 is a block diagram showing the arrangement of an image search apparatus according to an embodiment of the present invention.

FIG. 1 is a block diagram showing the arrangement of a moving image search apparatus according to this embodiment. A moving image search apparatus 100 displays a thumbnail image sequence that includes thumbnail images before and after the scene currently being played back in association with a moving image to be processed. As for the already stored moving image, the user can look back on the story of a moving image by watching a thumbnail image sequence before the scene currently being played back and can learn about a future story by watching a thumbnail image sequence after the scene currently being played back. Also, as for playback of a moving image the storage process of which is underway, the user can watch a previous thumbnail image sequence including a thumbnail image corresponding to the scene of the moving image currently being played back. Furthermore, the apparatus has a function of jumping the playback position to a scene corresponding to a thumbnail image by designating a thumbnail image that the user wants to watch.

As shown in FIG. 1, the image search apparatus 100 comprises a CPU 101, ROM 102, RAM 103, keyboard 104, mouse 105, external storage device 106, display 107, NIC 108, and an interface (I/F) 109 for a moving image recorder/player 110, which are connected via a system bus 111 to allow intercommunications.

The CPU 101 controls the operation of the overall moving image search apparatus 100 by executing a predetermined processing program stored in the ROM 102 or RAM 103. The ROM 102 stores processing programs (e.g., a boot program executed upon booting the moving image search apparatus 100, and the like), and various data, which are required for the CPU 101 to execute the operation control. The RAM 103 serves as a memory which loads a processing program from the ROM 102, external storage device 106, or the like under the control of the CPU 101, and provides a work area used when the CPU 101 executes various kinds of operation control.

The keyboard 104 and mouse 105 provide environments (various input operation environments) for various operation instructions to the moving image search apparatus 100. The external storage device 106 comprises a hard disk, floppy disk, CD-ROM, or the like. The display 107 comprises a CRT display or the like, and displays a processing result and the like to the user. The NIC 108 is a network interface, which communicates with respective apparatuses or systems on the network. The I/F 109 allows communications between the moving image recorder/player 110 (DVD or the like) and system bus 111.

In the arrangement shown in FIG. 1, the external storage device 106 may be located on the network connected via the NIC 108. As the moving image recorder/player 110, various apparatuses that can record and play back moving images such as a video camera, video deck, video player, and the like can be applied.

<Playback of Already Stored Moving Image>

During playback of a moving image, it is convenient for the user to scroll a thumbnail image sequence so as always to display a thumbnail image corresponding to the scene of the moving image currently being played back. This is because the user can look back on the story of a moving image by watching a thumbnail image sequence before the scene currently being played back and can learn about a future part of the story by watching a thumbnail image sequence after the scene currently being played back.

Furthermore, a jump to a scene corresponding to a thumbnail image can be made by designating a thumbnail image in the thumbnail image sequence that the user wants to watch.

Figure 2:
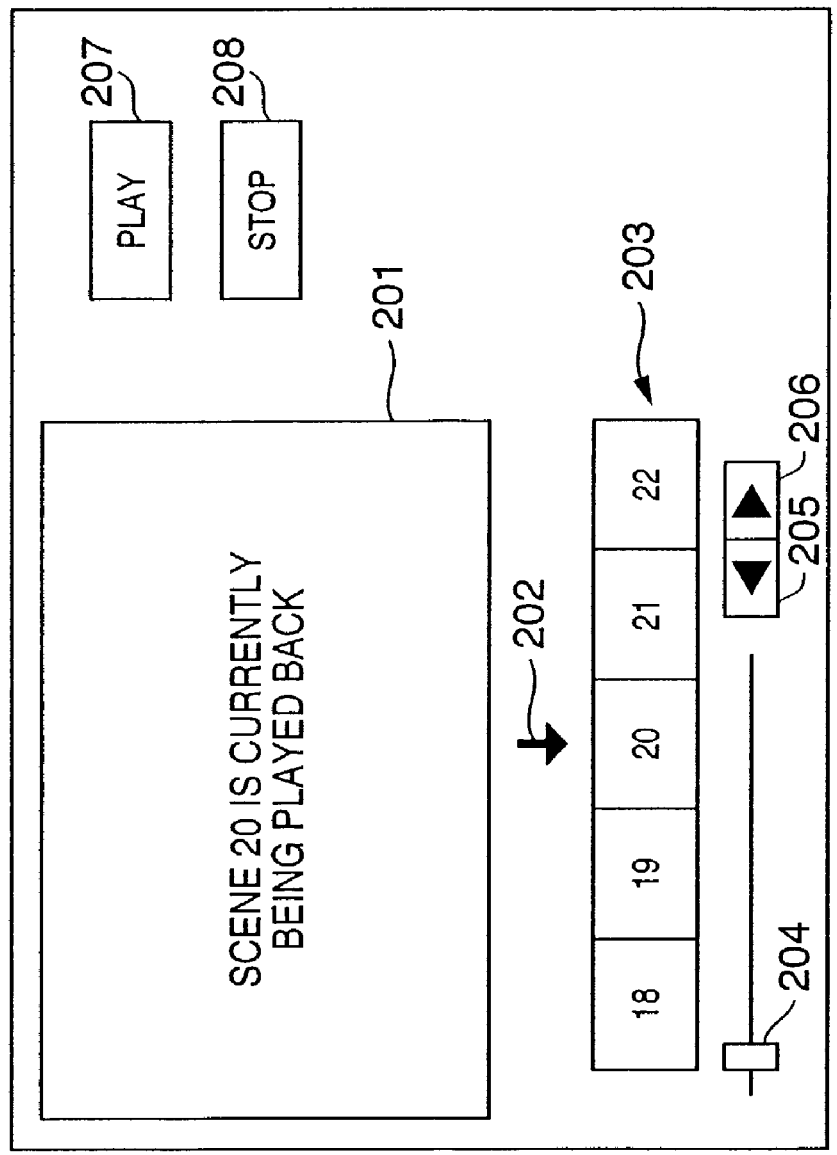
FIG. 2 shows the synchronous display state on a moving image playback area and thumbnail image sequence during playback of an already recorded moving image in the first embodiment.

FIG. 2 shows the display state of a moving image and thumbnail image sequence. Referring to FIG. 2, an arbitrary scene of a moving image of user's choice is played back on a moving image playback area 201. A thumbnail image sequence 203 displays thumbnail images of moving image frames that represent respective scenes. Reference numeral 202 denotes a pointer that points to a thumbnail image corresponding to a scene which is being played back on the moving image playback area 201. In this embodiment, when the thumbnail image sequence is displayed in synchronism with playback of the moving image, the thumbnail image sequence 203 is scrolled so that the thumbnail image corresponding to the scene currently being played back is displayed at the center of the thumbnail image sequence 203. Hence, the position of the symbol 202 is fixed during synchronous display of the thumbnail image sequence. In FIG. 2, scene 20 is being played back on the moving image playback area 201, and thumbnail images corresponding to scenes 18 to 22 are displayed on the thumbnail image sequence 203.

A slide bar 204 is a user interface used to point to the display position of the thumbnail image sequence in the entire moving image. Therefore, when the thumbnail image sequence is displayed in synchronism with the contents on the moving image playback area 201, the slide bar 204 indicates the display position of the scene played back on the moving image playback area 201 in the entire moving image. Once the user slides the slide bar 204 using the mouse or the like, synchronous display of the thumbnail image sequence 203 with the contents of the moving image playback area 201 is interrupted, and the thumbnail image sequence 203 is scrolled in accordance with the slide position on the user interface.

Scroll buttons 205 and 206 are user interfaces used upon slightly scrolling the thumbnail image sequence without delicate operation of the slide bar, since they can update the display contents on the thumbnail image sequence by a predetermined number of images, e.g., the number of thumbnail images in the thumbnail image sequence (five images in the example in FIG. 2). Using the scroll buttons 205 and 206, the user can finely adjust the scrolling even when the moving image has a long play time and scrolling cannot be finely adjusted by the scroll bar.

A play button 207 is used to instruct start of playback of a moving image on the moving image playback area 201. A stop button 208 is a user interface used to stop playback of a moving image on the moving image playback area 201. When playback of a moving image is stopped by the stop button 208, it can restart from the stop position by the user pressing the play button 207.

As for display of the thumbnail image sequence 203 during playback of an already stored moving image, it is preferable to display a thumbnail image corresponding to a scene that is being played back on the moving image playback area 201, near the center of the thumbnail image sequence, so as to display both previous and future thumbnail images, as shown in FIG. 2, for the purpose of easy searching/browsing of scenes. In the example shown in FIG. 2, scene 20 is being played back, and a thumbnail image corresponding to scene 20 is located at the center of the thumbnail image sequence 203.

In this case, the symbol 202 is displayed at the display position of the thumbnail image corresponding to the scene of the moving image currently being played back, as shown in FIG. 2. In the example in FIG. 2, the symbol is an arrow.

In this state, when the user designates a desired one of thumbnail images of the displayed thumbnail image sequence 203 using, e.g., the mouse cursor or the like, the playback position of the moving image to be played back on the moving image playback area 201 can jump to a scene corresponding to the designated thumbnail image. However, when the thumbnail image sequence 203 is displayed in synchronism with the moving image currently being played back, the thumbnail image sequence 203 may scroll at a delicate timing before the user designates a desired thumbnail image, and the playback position of the moving image may jump to a scene that the user did not intend.

In this embodiment, in order to avoid such situation, when the cursor of the pointing device or cursor key is located within a predetermined area including the thumbnail image sequence 203, synchronous display of the thumbnail image sequence with respect to the moving image currently being played back is interrupted. In this manner, the thumbnail image sequence can be prevented from being scrolled at a delicate timing while the user is trying to designate a particular thumbnail image, and the user can reliably designate the desired thumbnail image. Note that the predetermined area includes at least the thumbnail image sequence 203, i.e., an area required to make a scene jump.

As for display of the symbol 202 during interruption of synchronous display, the symbol 202 may be continuously displayed, but its display form is preferably changed to inform the user that synchronous display is interrupted. As the change in display form, the symbol 202 may be cleared, the color of the symbol 202 may be changed to be distinguished from another state, the symbol 202 may be flickered, and so forth. The display form may be selected based on the design concept during design.

When the cursor that moves upon operation of the pointing device or cursor key falls outside the predetermined area including the thumbnail image sequence 202 during interruption of synchronous display, synchronous display of the thumbnail image sequence with respect to the moving image currently being played back is restarted. That is, a thumbnail image corresponding to the scene currently being played back at that time is located at the center of the thumbnail image sequence 203, thumbnail images corresponding to two previous scenes are displayed on the left side of that thumbnail image, and those corresponding to two future scenes are displayed on the right side. Of course, if jump designation is made while synchronous display is interrupted (an arbitrary thumbnail image is designated), the moving image begins to be played back from the designated scene on the moving image playback area 201, and synchronous display of the thumbnail image sequence starts.

A case will be explained below where the thumbnail image sequence has been scrolled.

When the user wants to display a thumbnail image sequence corresponding to scenes before or after the thumbnail image sequence 203 currently undergoing synchronous display, he or she scrolls the thumbnail image sequence using the scroll bar 204 to display a thumbnail image sequence at an arbitrary position. Or the user can scroll the thumbnail image sequence by pressing the scroll button 205 or 206 so as to display a thumbnail image sequence a predetermined number of scenes before or after the current scene.

When the user has made such scroll operation, since he or she does not want to continue synchronous display of the thumbnail image sequence with respect to the moving image currently being played back, synchronous display of the thumbnail image sequence is interrupted. During interruption of synchronous display, the display form of the symbol 202 may be changed (the symbol may be cleared, its display color may be changed, the symbol may be flickered, or the like) to explicitly indicate that synchronous display is interrupted.

When the user cannot find any previous or future scene as a jump destination after he or she has scrolled the thumbnail image sequence 203 or when the user has scrolled the thumbnail image sequence to previous or future scenes to simply trace the flow of scenes, it is inconvenient for the user if a means that can restart synchronous display of the thumbnail image sequence with respect to the moving image currently being played back cannot be provided to the user. The image search apparatus disclosed in Japanese Patent No. 3058333 has no user interface that permits the user intentionally to restart synchronous display of the thumbnail image sequence with respect to the moving image currently being played back.

Figure 3:
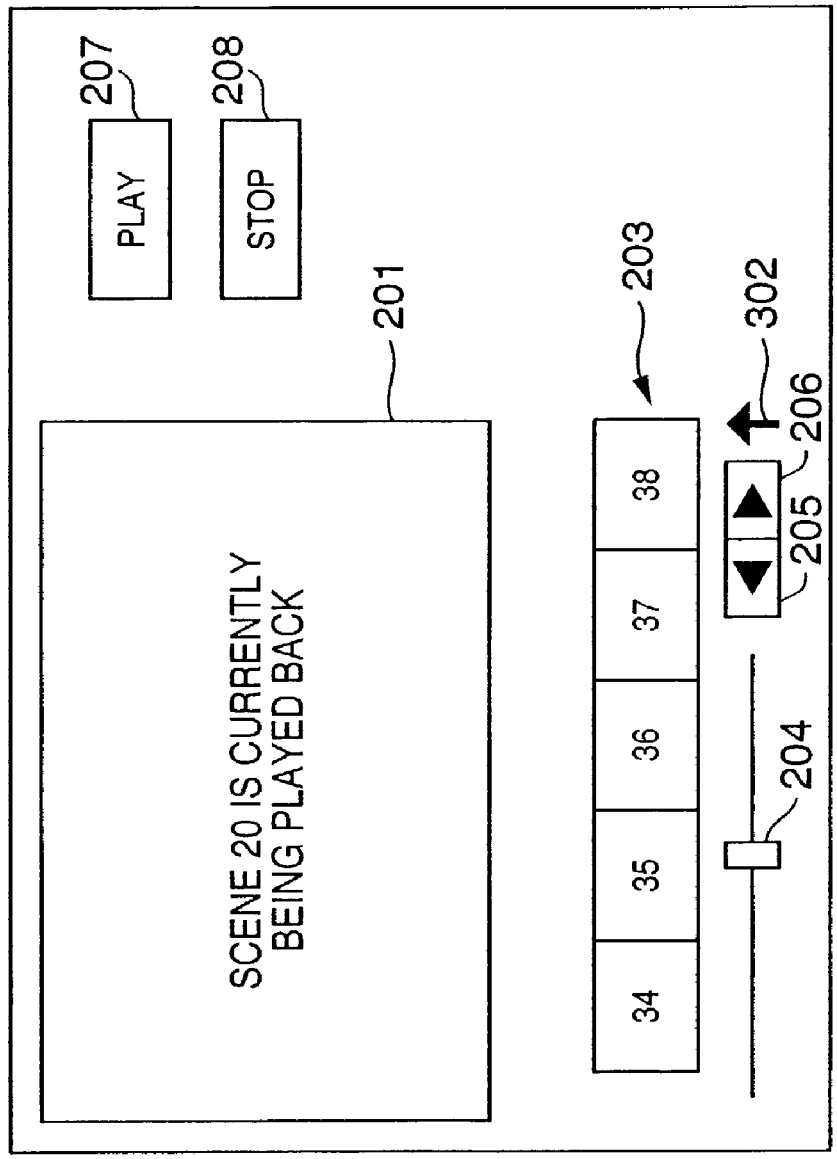
FIG. 3 shows an operation window upon scrolling the thumbnail image sequence during playback of the already recorded moving image in the first embodiment.

In this embodiment, in order to effect such intentional restart or synchronous display of the thumbnail image sequence with respect to the moving image currently being played back, the control transits to a state shown in FIG. 3, and a symbol 302 for restoring synchronous display is displayed. By the user clicking this symbol icon 302, the control transits to the state shown in FIG. 2, restarts synchronous display of the thumbnail image sequence with respect to the moving image currently being played back, and re-displays the symbol 202 that indicates the position of a thumbnail image corresponding to a scene which is being synchronously played back. In this embodiment, the symbol 302 uses an arrow as in the symbol 202. The display position of the symbol 302 is a predetermined position different from that of the symbol 202 that indicates a thumbnail image. When synchronous display of the thumbnail image sequence is restarted, the control returns to the display state shown in FIG. 2 to clear the symbol 302.

<Playback of Moving Image During Storage>

Playback of a moving image, the storage process of which is in progress, will be described below. In recent years, an apparatus which traces and plays back a moving image from a position a predetermined period of time before, while storing that moving image in a storage medium such as an HDD or the like, is commercially available, and such image storage system is proposed by Japanese Patent Laid-Open No. 7-296445. For an image, the storage process of which is underway, no future scenes are available, and previous scenes are displayed in synchronous display of a thumbnail image sequence.

Figure 4:
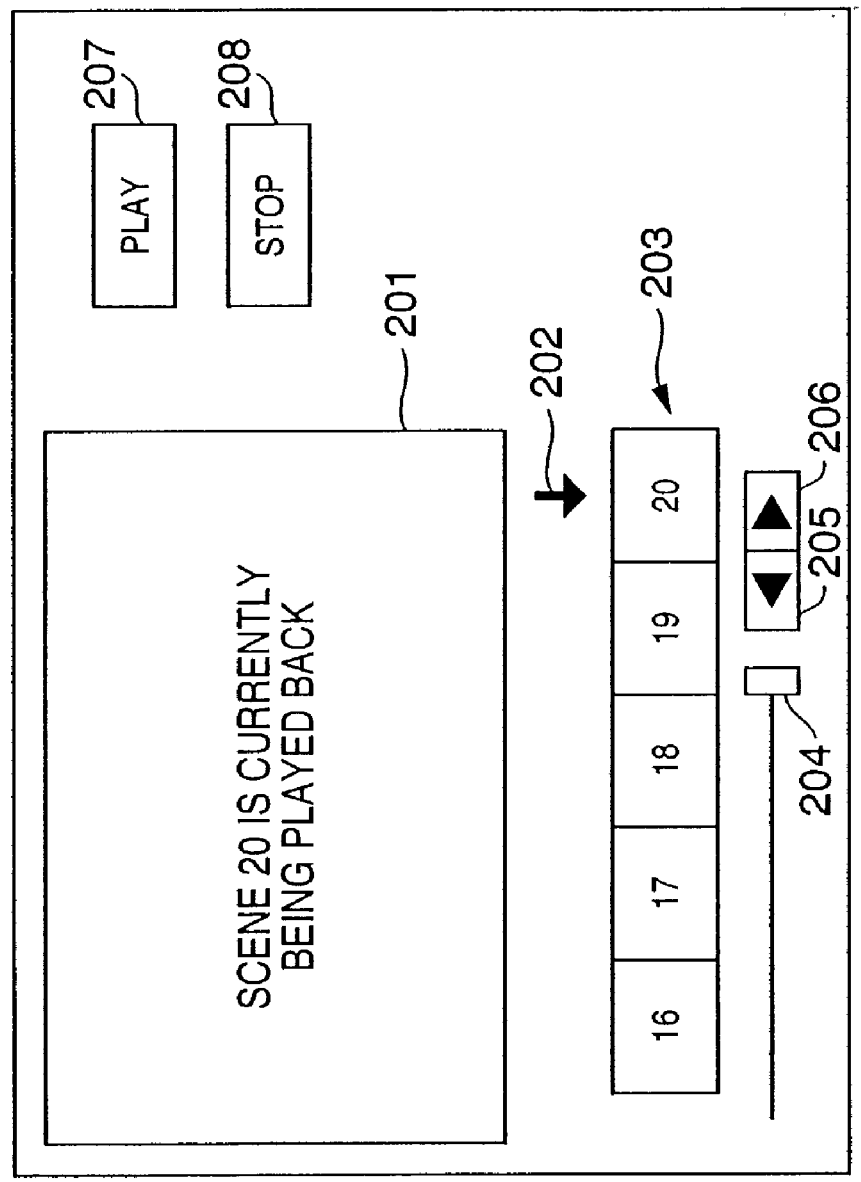
FIG. 4 shows the synchronous display state on a moving image playback area and thumbnail image sequence during pursuit playback of the already recorded moving image in the first embodiment.

FIG. 4 is a view for explaining the playback state of a moving image, the storage process of which is underway. The same reference numerals in FIG. 4 denote the same user interfaces as those in FIG. 2.

As shown in FIG. 4, the thumbnail image sequence 203 is displayed in synchronism with a moving image currently being played back. As described above, in the case of an image storage of which is underway, no future thumbnail images are available. Therefore, the thumbnail image sequence 203 displays a thumbnail image corresponding to a scene the recording process of which is now in progress, at the right end, i.e., the terminal end, of the thumbnail image sequence 203, as shown in FIG. 4. In the example of FIG. 4, a scene, the recording process of which is now in progress, is scene 20, and a thumbnail image corresponding to scene 20 is displayed at the right end of the thumbnail image sequence. In this case, the symbol 202 is displayed to indicate the thumbnail image at the right end of the thumbnail image sequence 203. Note that the symbol 202 is also an arrow in the example of FIG. 4.

In the state shown in FIG. 4, when the user wants to jump the playback position of the moving image to a scene corresponding to one of thumbnail images displayed on the thumbnail image sequence 203, he or she designates a desired thumbnail image using the mouse cursor or the like. However, during synchronous display of the thumbnail image sequence 203, scroll may take place at a delicate timing with respect to designation of a thumbnail image, and the playback position of the moving image may jump to a scene that the user did not intend.

To avoid such case, as described above, when the cursor that moves upon operation of the pointing device or cursor key falls within the predetermined area including the thumbnail image sequence 203, synchronous display of the thumbnail image sequence with respect to the moving image currently being played back is interrupted. Note that the predetermined area includes at least the thumbnail image sequence 203, i.e., an area required to make a scene jump.

During interruption of synchronous display, the display form of the symbol 202 may be changed to explicitly indicate that synchronous display is interrupted. As the change in display form, the symbol 202 may be cleared, the color of the symbol 202 may be changed to be distinguished from another state, the symbol 202 may be flickered, and so forth. The display form may be selected based on the design concept during design.

When the cursor of the pointing device or cursor key falls outside the predetermined area during interruption of synchronous display, synchronous display of the thumbnail image sequence with respect to the moving image currently being played back is restarted.

A case will be explained below wherein the thumbnail image sequence 203 is scrolled during image storage. When the user wants to display thumbnail images before the thumbnail image sequence during synchronous display, he or she scrolls the thumbnail image sequence. The scroll operation is implemented using the scroll bar 204 or the scroll button 205 or 206. By operating the scroll bar 204 or the scroll button 205 or 206 from the state in FIG. 4, a display state shown in, e.g., FIG. 5 is obtained.

When the user has made such scroll operation, since he or she does not want to continue synchronous display of the thumbnail image sequence with respect to the moving image currently being played back, synchronous display is interrupted. In such case, the display form of the symbol 202 may be changed (the symbol may be cleared, its display color may be changed, the symbol may be flickered, or the like) to explicitly indicate that synchronous display is interrupted.

However, when the user cannot find any previous scene as a jump destination by such scroll operation or when the user has scrolled the thumbnail image sequence to previous scenes simply to trace the flow of scenes, he or she wants to restart synchronous display of the thumbnail image sequence with respect to the moving image currently being played back by simple operation. Japanese Patent No. 3058333 does not consider any pursuit playback of a moving image the recording process of which is in progress, and no user interface that can intentionally restart synchronous display of the thumbnail image sequence with respect to the moving image during pursuit playback is available.

Figure 5:
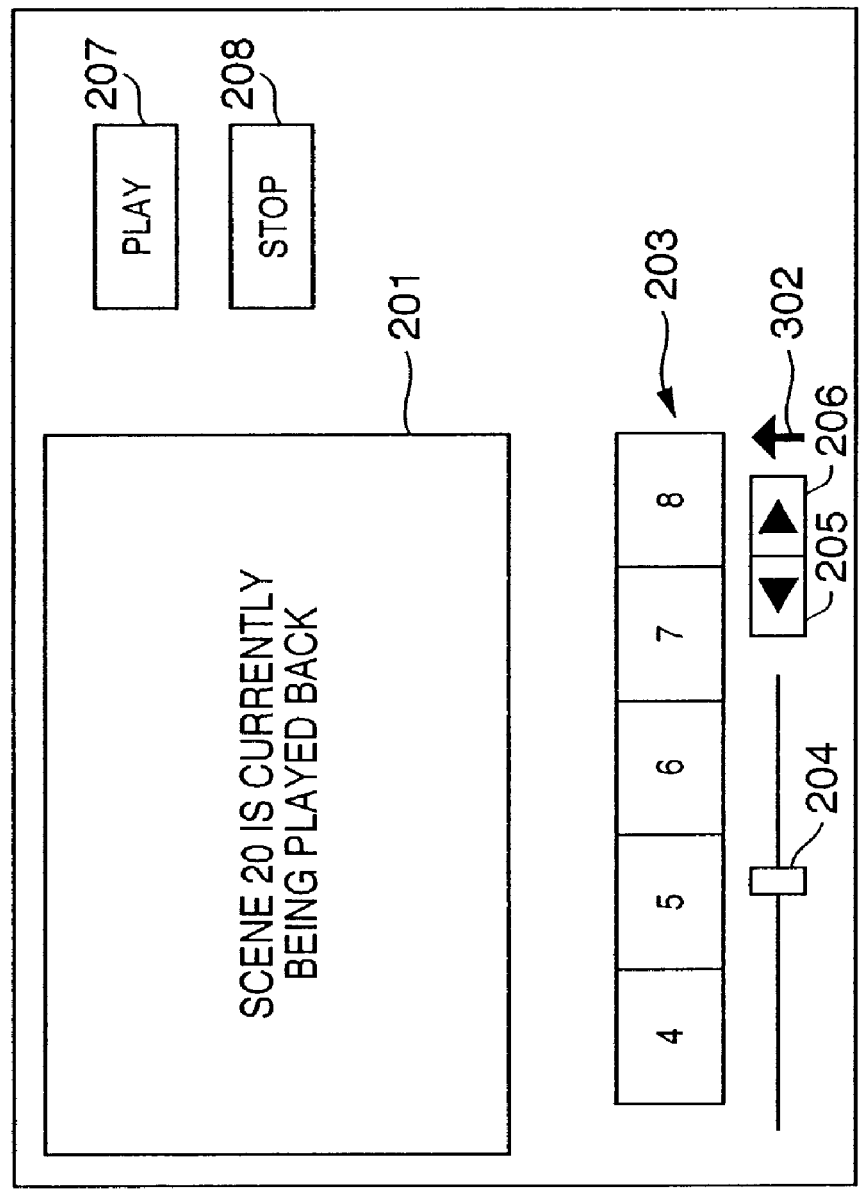
FIG. 5 shows an operation window upon scrolling the thumbnail image sequence during pursuit playback of the already recorded moving image in the first embodiment.

Hence, in order to intentionally restart interrupted synchronous display of the thumbnail image sequence with respect to the moving image currently being played back, the control transits to a state shown in FIG. 5, and the symbol 302 for restoring synchronous display is displayed, as in FIG. 3. By the user clicking this symbol icon 302, the control transits to the state shown in FIG. 4, and restarts synchronous display of the thumbnail image sequence with respect to the moving image currently being played back. At this time, the symbol 302 used to restart synchronous playback of the thumbnail image sequence is cleared.

<Description of Operation Using State Transition Chart>

As described above, in this embodiment, there are two types of interruptions of synchronous display, i.e., interruption of synchronous display when the cursor falls within the predetermined area including the thumbnail image sequence during synchronous display, and that when the thumbnail image sequence has been scrolled to display thumbnail images corresponding to scenes before or after the thumbnail image sequence during synchronous display. These two interruptions of synchronous display must have different operation state transitions. For the sake of simplicity, playback of an already stored moving image (FIG. 2), and that of a moving image, the storage process of which is underway (FIG. 4), will be explained together. As can be seen from the above description, thumbnail images of previous, current, and future scenes can be displayed and selected as a jump destination upon playing back an already stored moving image, while thumbnail images of previous and current scenes can be displayed and selected as a jump destination upon playing back a moving image, the storage process of which is in progress. Also, when the thumbnail image sequence is synchronously displayed, a thumbnail image corresponding to the scene currently being played back is located at the center of the thumbnail image sequence, and the symbol 202 is displayed at a position which indicates that scene, in the display example in FIG. 2. However, in the display example in FIG. 4, a thumbnail image corresponding to the scene currently being played back is located at the terminal end (right end) of the thumbnail image sequence, and the symbol 202 is displayed at a position which indicates that scene.

Figure 6:
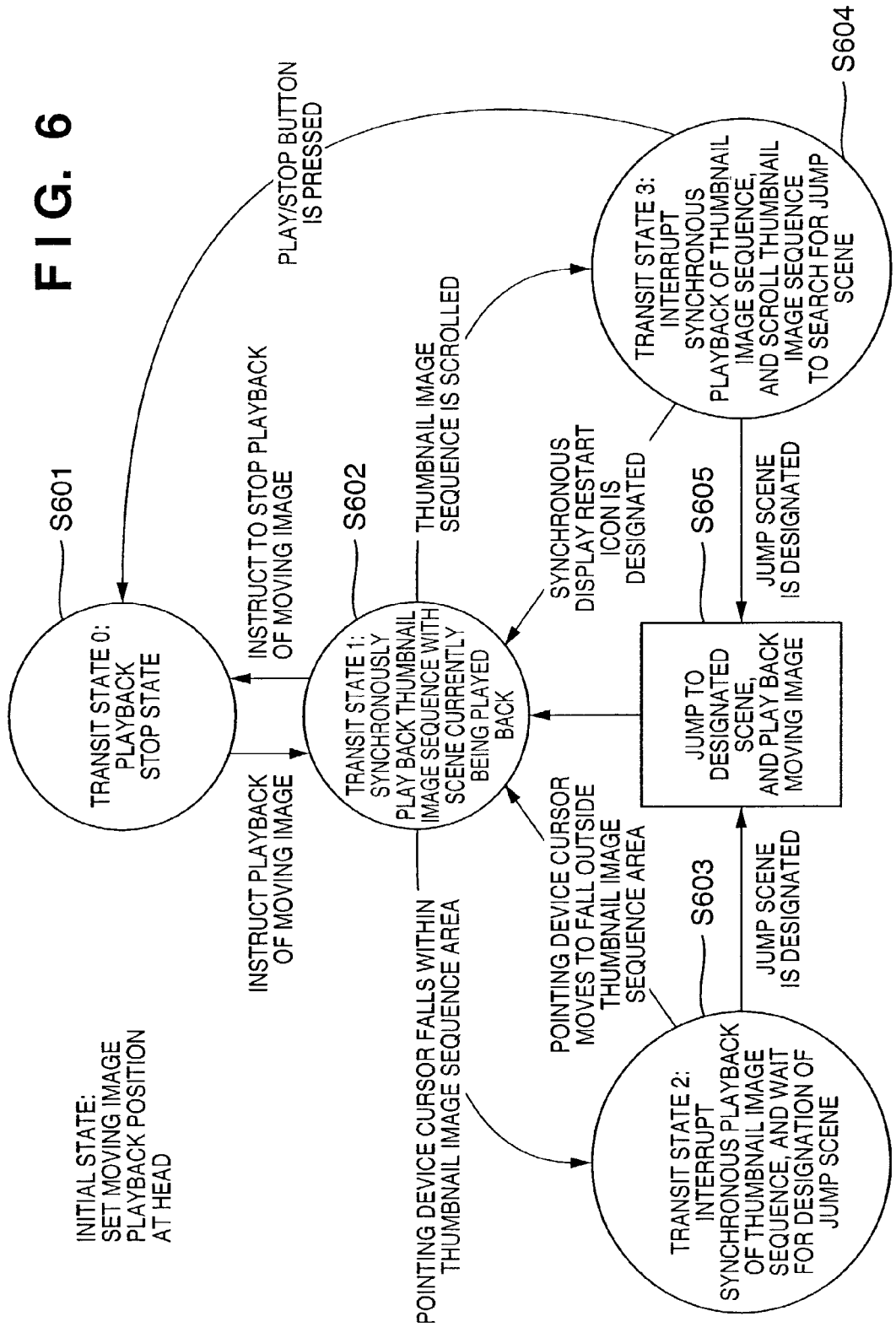
FIG. 6 is a transition chart of the operation states of the moving image search apparatus of this embodiment.

FIG. 6 shows an example associated with state transition of the user interface in this embodiment. Of course, the number of states becomes larger than that in FIG. 6 as operations are more complicated. For example, operation states such as slow playback, single frame step playback, fastforwarding, rewinding, and the like of a normal VTR may be added.

On the user interface of this embodiment, transitions among four states which consider a user's operation, in response to which synchronous display of the thumbnail image sequence with respect to the moving image currently being played back is to be interrupted, and another user's operation, in response to which synchronous display of the thumbnail image sequence with respect to the moving image currently being played back is to be restarted, are examined.

In FIG. 6, transit state 0 (S601) is a playback paused state. Immediately after a moving image to be played back is designated in this state, the playback start position is normally set at the head of that moving image. Transit state 1 (S602) is a state in which the thumbnail image sequence 203 is displayed in synchronism with scenes of the moving image to be played back on the moving image playback area 201. Transit state 2 (S603) is a state wherein synchronous display of the thumbnail image sequence with respect to scene playback of the moving image is interrupted, and the control waits for a user's scene jump instruction. Transit state 3 (S604) is a state wherein synchronous display of the thumbnail image sequence with respect to scene playback of the moving image is interrupted, and a thumbnail image sequence corresponding to current, previous, or future scenes (current or previous scenes in case of FIG. 4) is displayed.

Transition from transit state 0 (S601) to transit state 1 (S602) takes place in response to a user's moving image playback instruction. Transition to transit state 0 (S601) takes place in response to a user's moving image playback pause instruction in transit state 1 (S602) or 3 (S604).

Transition to transit state 2 (S603) occurs only when the cursor of the pointing device or cursor key falls within the predetermined area including the thumbnail image sequence 203 in transit state 1. Since transition to transit state 2 takes place in this way, synchronous display of the thumbnail image sequence is suspended, and a thumbnail image that the user did not intend can be avoided from being designated by automatic scrolling upon displaying the thumbnail image sequence in synchronism with the moving image currently being played back, as described above. Also, the display form of the symbol 202 may be changed in transit state 2 to indicate that the synchronous display is interrupted, as described above.

In transit state 2, when the cursor of the pointing device or cursor key falls outside the predetermined area including the thumbnail image sequence 203, the control transits to transit state 1 (S602), and restarts synchronous display of the thumbnail image sequence with respect to the moving image currently being played back.

When a desired thumbnail image is designated (or jump designation is made) during interruption of synchronous display (transit state 2), jump playback is made to play back the moving image from the designated scene (S605). After that, the control transits to transit state 1 (S602) to play back and display the moving image from the designated scene on the moving image playback area 201. When the thumbnail image sequence is to be displayed in synchronism with the moving image to be played back immediately after a jump is made to the designated scene, a process for escaping the cursor of the pointing device or cursor key from the predetermined area including the thumbnail image sequence 203 may be inserted immediately before or after jump playback (S605).

Transition to transit state 3 (S604) takes place when the thumbnail image sequence has been scrolled by operating the scroll bar 204 or scroll button 205 or 206 in transit state 1. When the control transits to transit state 3, since the user does not want to continue synchronous display of the thumbnail image sequence, synchronous display is interrupted. At this time, the display form of the symbol 202 may be changed to explicitly indicate that synchronous display of the thumbnail image sequence is interrupted, as described above.

When the user cannot find any previous or future scene as a jump destination or when the user has scrolled to a previous or future scene to simply trace the flow of scenes in transit state 3, he or she wants to restart synchronous display of the thumbnail image sequence with respect to the moving image currently being played back. Hence, the control restores transit state 1 (S602), and displays the symbol 302, as shown in FIG. 3, to synchronous playback of the thumbnail image sequence. In this embodiment, the symbol 302 has the same "arrow" design as the symbol 202 so that the user can easily understand it. By clicking this symbol 302, the control transits to transit state 1 (S602) after the symbol 302 is cleared, thus restarting synchronous display of the thumbnail image sequence, and re-displaying the symbol 202.

When the user designates a desired scene (thumbnail image) in transit state 3 (S604), jump playback is made to play back the designated scene (S605). The control then transits to transit state 1 (S602) to restart synchronous display of the thumbnail image sequence in accordance with the scene currently being played back. If the user designates the stop button 208 in transit state 1 or 3, the control transits to transit state 0 (S601).

<Functional Arrangement and Control Sequence>

Figure 7:
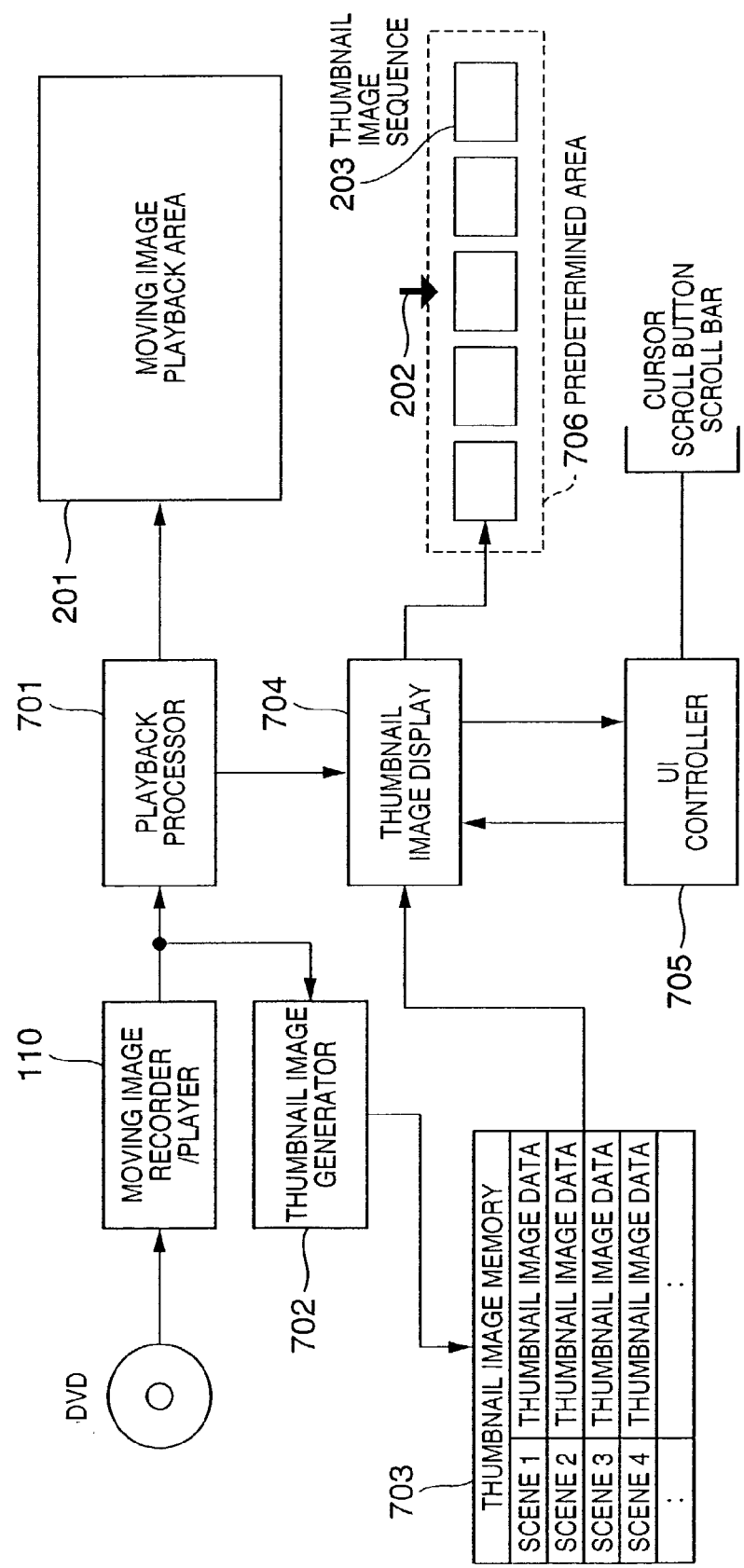
FIG. 7 is a block diagram showing the functional arrangement of the moving image search apparatus according to this embodiment.

FIG. 7 is a block diagram showing the functional arrangement for implementing the aforementioned processes in the moving image search apparatus of this embodiment. Referring to FIG. 7, reference numeral 701 denotes a playback processor for playing back and displaying a moving image output form the moving image recorder/player 110 on the moving image playback area 201. The playback processor 701 outputs a signal which indicates the playback or recording process, which is in progress in the moving image recorder/player 110, and a signal which specifies a scene currently being played back on the moving image playback area 201, to a thumbnail image display 704.

Reference numeral 702 denotes a thumbnail image generator, which extracts frame images of respective scenes from the moving image information output from the moving image recorder/player 110, generates thumbnail image data of the extracted frame images, and holds them in a thumbnail image memory 703. The thumbnail image memory 703 is assured on the external storage device 106 such as a hard disk or the like, and holds the respective scenes and thumbnail image data in correspondence with each other. In this embodiment, the moving image is delimited at predetermined time intervals (e.g., 10 sec) to obtain scenes, thumbnail images are generated from the first frame images of respective scenes, and these images are held as thumbnail image data corresponding to the scenes. The methods of determining each scene and a corresponding thumbnail image are not limited to the aforementioned methods. For example, as the method of determining each scene, the number of scenes may be determined in advance, and the total play time of the moving image may be divided by the number of scenes to determine a duration per scene.

Reference numeral 704 denotes a thumbnail image display, which specifies the current scene being played back on the basis of the signal input from the playback processor 701, reads out required thumbnail image data from the thumbnail image memory 703, and synchronously displays the thumbnail image sequence. Note that the signal from the playback processor 701 includes a signal indicating if the current moving image being played back is an already recorded image, or its recording process is underway. In case of the already recorded moving image, the thumbnail image display 704 makes synchronous display, as shown in FIG. 2. Also, in the case of the moving image whose recording process is in progress, the thumbnail image display 704 makes synchronous display, as shown in FIG. 4.

Reference numeral 705 denotes a UI controller, which implements a jump operation to a desired scene, a scroll operation of the thumbnail image sequence, and the like. Reference numeral 706 denotes a predetermined area including the thumbnail image sequence 203. When the cursor falls within this predetermined area 706, the UI controller 705 sends a message indicating this to the thumbnail image display 704, which interrupts synchronous display of the thumbnail image sequence.

Figure 8:
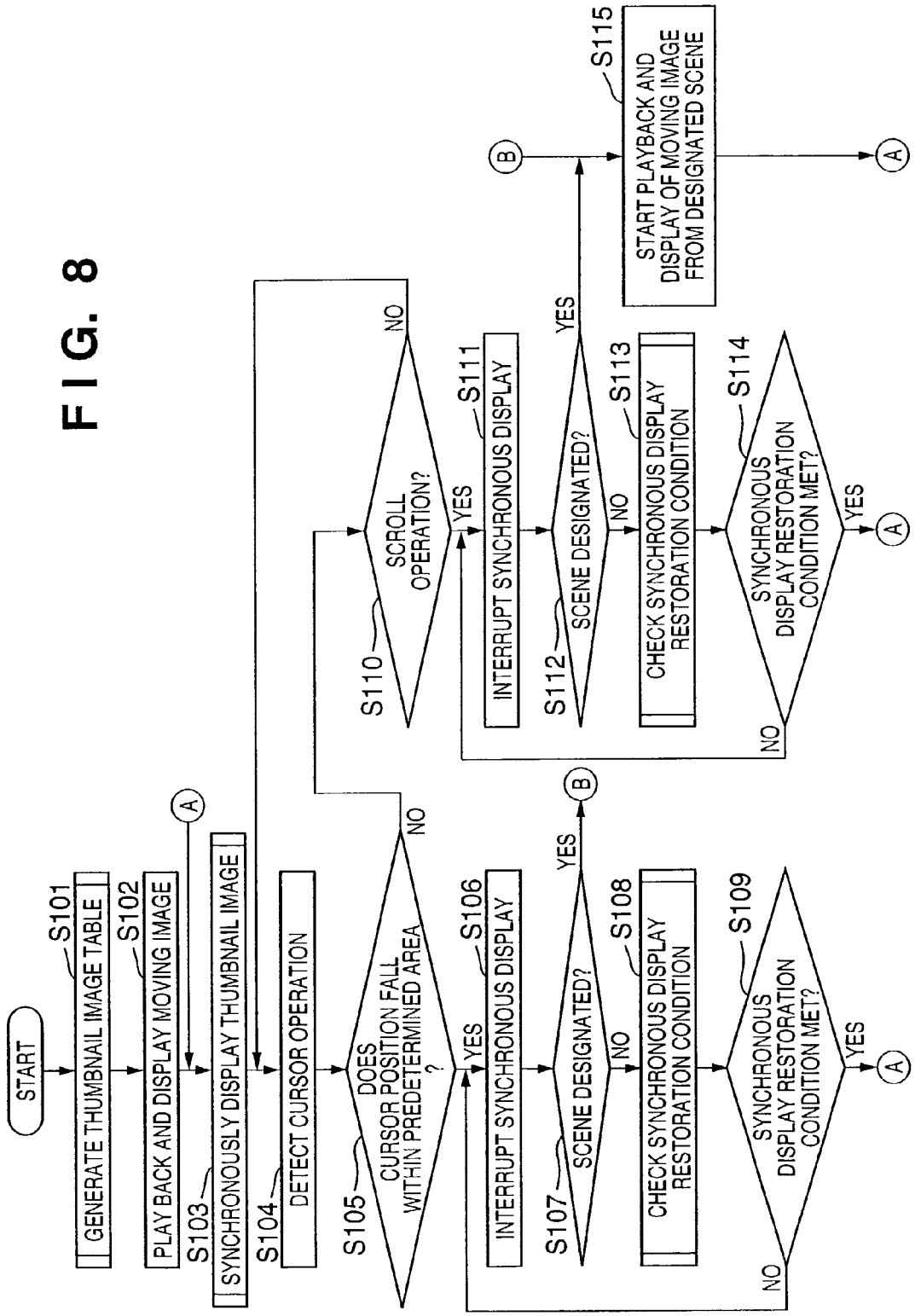
FIG. 8 is a flow chart for explaining the operation of the moving image search apparatus according to this embodiment.

FIG. 8 is a flow chart for explaining the moving image playback process, thumbnail image display process, and process associated with the UI control according to this embodiment. In step S101, the thumbnail image generator 702 generates thumbnail image data, and stores them in the thumbnail image memory 703. If the moving image to be played back is an already recorded one, and a corresponding thumbnail image data group has already been held in the thumbnail image memory 703, this process can be skipped. For example, a moving image ID is assigned to a thumbnail image data group, and the ID of a moving image to be played back is acquired to search for a thumbnail image data group corresponding to the acquired ID, thus checking if the thumbnail image data of the moving image to be played back have already been held in the thumbnail image memory 703. On the other hand, if the moving image to be played back is the one whose recording process is underway, thumbnail image data are generated and held parallel to pursuit playback.

In step S102, the playback processor 701 begins to play back a moving image on the moving image playback area 201 on the basis of moving image data sent from the moving image recorder/player 110. In step S103, the thumbnail image display 704 begins to make synchronous display of the thumbnail image sequence 203 on the basis of the signal from the playback processor 701. Synchronous display of the thumbnail image sequence is made, as shown in FIG. 2, when the already recorded moving image data is played back, or it is made, as shown in FIG. 4, when moving image data, the recording process of which is in progress, undergoes pursuit playback, as described above. Execution of steps S102 and S103 corresponds to transition to transit state 1 in FIG. 6.

In step S104, the UI controller 705 detects cursor operation. As a result of this detection, if it is determined that the cursor has entered the predetermined area 706, the flow advances from step S105 to step S106. This process corresponds to transition from transit state 1 to transit state 2. In step S106, synchronous display of the thumbnail image sequence is interrupted, and the display form of the symbol 202 is changed.

Furthermore, the UI controller 705 monitors if one thumbnail image in the thumbnail image sequence is designated. It is checked in step S107 if one thumbnail image in the thumbnail image sequence 203 is designated. If YES in step S107, the flow jumps to step S115 to jump the playback position to a scene corresponding to the designated thumbnail image and to start playback of the moving image. The flow then returns to step S103 to restart synchronous display of the thumbnail image sequence. This process corresponds to transition from transit state 2 to transit state 1 via S605 in FIG. 6.

If NO in step S107, the flow advances from step S107 to step S108 to check if synchronous display of the thumbnail image sequence is to be restored. In step S108, whether or not the cursor falls outside the predetermined area 706 is detected as a restoration condition to synchronous display of the thumbnail image sequence. If this restoration condition is met, the flow returns from step S109 to step S103 to restart synchronous display of the thumbnail image sequence. This process corresponds to direct transition from transit state 2 to transit state 1. If the restoration condition is not met, the flow returns from step S109 to step S106 to maintain the interrupted state of synchronous display, i.e., transit state 2.

On the other hand, if the UI controller 705 detects some scroll operation (operation of the scroll bar 204 or the scroll button 205 or 206), the flow advances from step S110 to step S111 to interrupt synchronous display of the thumbnail image sequence, to change the display form of the symbol 202, and to display the symbol 302 used for a restoration operation. This process corresponds to transition from transit state 1 to transit state 3.

It is checked in step S107 if one thumbnail image of the thumbnail image sequence 203 is designated. If YES in step S107, the flow jumps to step S115 to jump the playback position to a scene corresponding to the designated thumbnail image and to start playback of the moving image. The flow then returns to step S103 to restart synchronous display of the thumbnail image sequence. This process corresponds to transition from transit state 2 to transit state 1 via S605.

Furthermore, the UI controller 705 monitors if one thumbnail image of the thumbnail image sequence is designated. It is checked in step S112 if one thumbnail image of the thumbnail image sequence 203 is designated. If YES in step S112, the flow advances to step S115 to jump the playback position to a scene corresponding to the designated thumbnail image and to start playback of the moving image. The flow then returns to step S103 to restart synchronous display of the thumbnail image sequence. This process corresponds to transition from transit state 2 to transit state 1 via S605.

If no scene is designated in step S112, the flow advances to step S113 to check if synchronous display of the thumbnail image sequence is restored. In step S112, whether or not the symbol 302 displayed in step S111 is clicked is detected as a restoration condition to synchronous display of the thumbnail image sequence. If this restoration condition is met, the flow returns from step S114 to step S103 to restart synchronous display of the thumbnail image sequence. This process corresponds to direct transition from transit state 3 to transit state 1. If the restoration condition is not met, the flow returns from step S114 to step S111 to maintain the interrupted state of synchronous display, i.e., transit state 3.

In the above embodiment, the display operation windows shown in FIGS. 2, 3, 4, and 5 have been exemplified, and an explanation has been given using the corresponding operation state transition chart shown in FIG. 6. However, the present invention is not limited to these display operation windows and operation state transition chart.

For example, the present invention can be applied to all modifications to which the gist "operation state transition that can switch synchronous display and asynchronous display of a moving image during display and a thumbnail image sequence indicating the contents of the moving image as needed from the user's viewpoint is prepared, and a restoration UI from an asynchronous state to a synchronous state, which allows the user to intuitively recognize the asynchronous state is provided" can be applied, even when the number of operation functions/buttons or transit states is increased. Of course, an embodiment that partially uses operation state transition chart is available. For example, synchronous display of thumbnail images may be interrupted in either transit state 2 or 3, and the user can designate a thumbnail image as a jump scene and can jump to that scene. Therefore, the present invention can be applied to one of the process executed upon scrolling (transit state 3) and that executed upon selecting a thumbnail image (transit state 2).

In the above embodiment, the synchronous display restart icon in FIGS. 3 and 5 has the same design as that indicating a thumbnail image corresponding to a scene currently being played back. Of course, these icons may have different designs.

As described above, according to the above embodiment, in a moving image search apparatus that can scroll a thumbnail image sequence, which is displayed simultaneously with playback of a moving image, in the time-axis direction, and can jump the playback position of the moving image to a desired scene by clicking a thumbnail image of the desired scene, when the user cannot find any scene that he or she wants to watch, and wants to continue to watch a moving image, although he or she has scrolled the thumbnail image sequence, or when the user has scrolled the thumbnail image sequence in the time direction to merely explore future scenes of the moving image, the thumbnail image sequence display state which is synchronized with the moving image currently being played back can be easily restored. Furthermore, when the user is about to select a desired thumbnail image while the thumbnail image sequence is automatically scrolled in synchronism with the displayed moving image, since synchronous display is interrupted, a problem that the thumbnail image sequence is automatically scrolled at a delicate timing and the user selects a thumbnail image that he or she did not intend can be solved. Hence, a more convenient image search function can be provided to the user.

Second Embodiment

In the first embodiment, it is checked in step S113 if the synchronous display restoration condition is met, upon returning from transit state 3 to transit state 1. In the first embodiment, the restoration instruction symbol 302 is displayed at a predetermined position, and whether or not the symbol 302 is clicked is detected as the synchronous display restoration condition. That is, the synchronous display state of the thumbnail image sequence is restored by making the user positively express his or her wishes to restore synchronous display. In the second embodiment, the duration of a given operation state is measured, and it is checked based on this duration if the user does not want to make scroll or scene jump operation. That is, the duration of a given operation state is detected as a synchronous display restoration condition.

Figure 9:
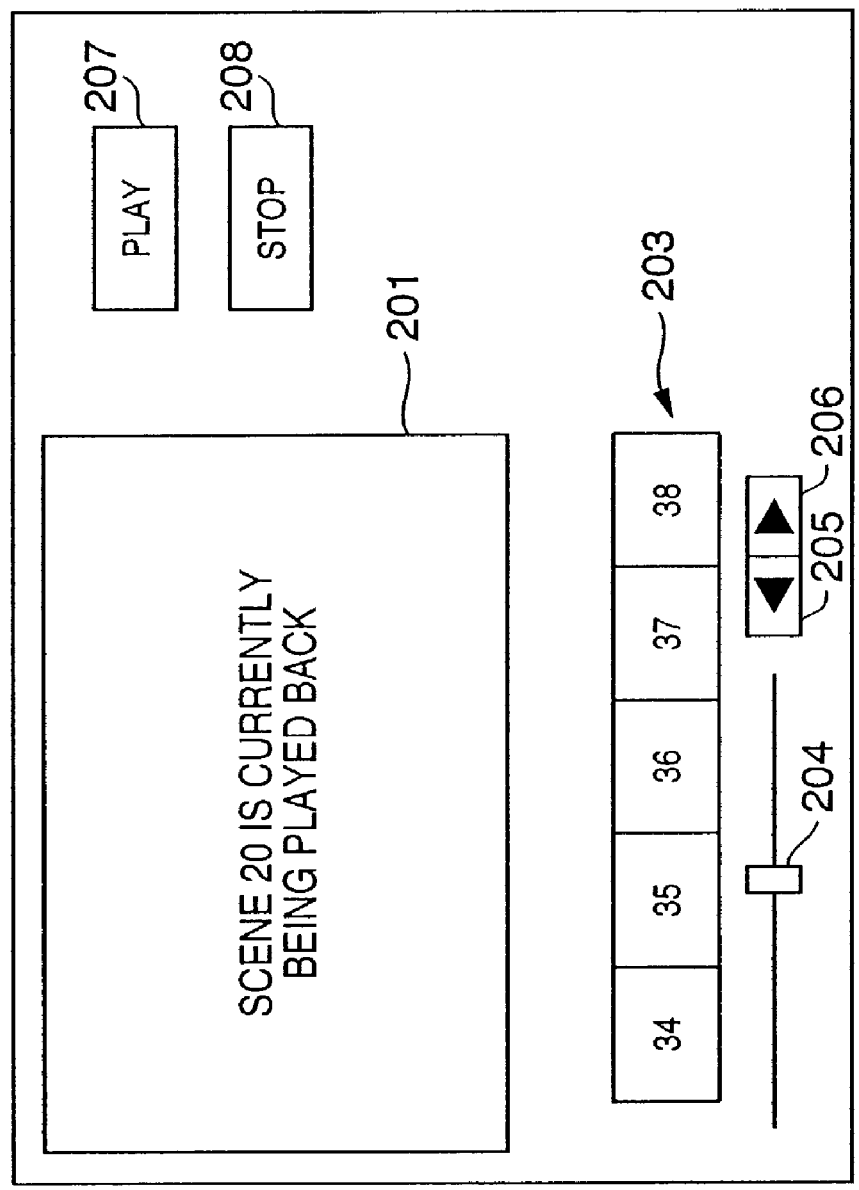
FIG. 9 shows an operation window upon scrolling a thumbnail image sequence during playback of an already recorded moving image.
Figure 10:
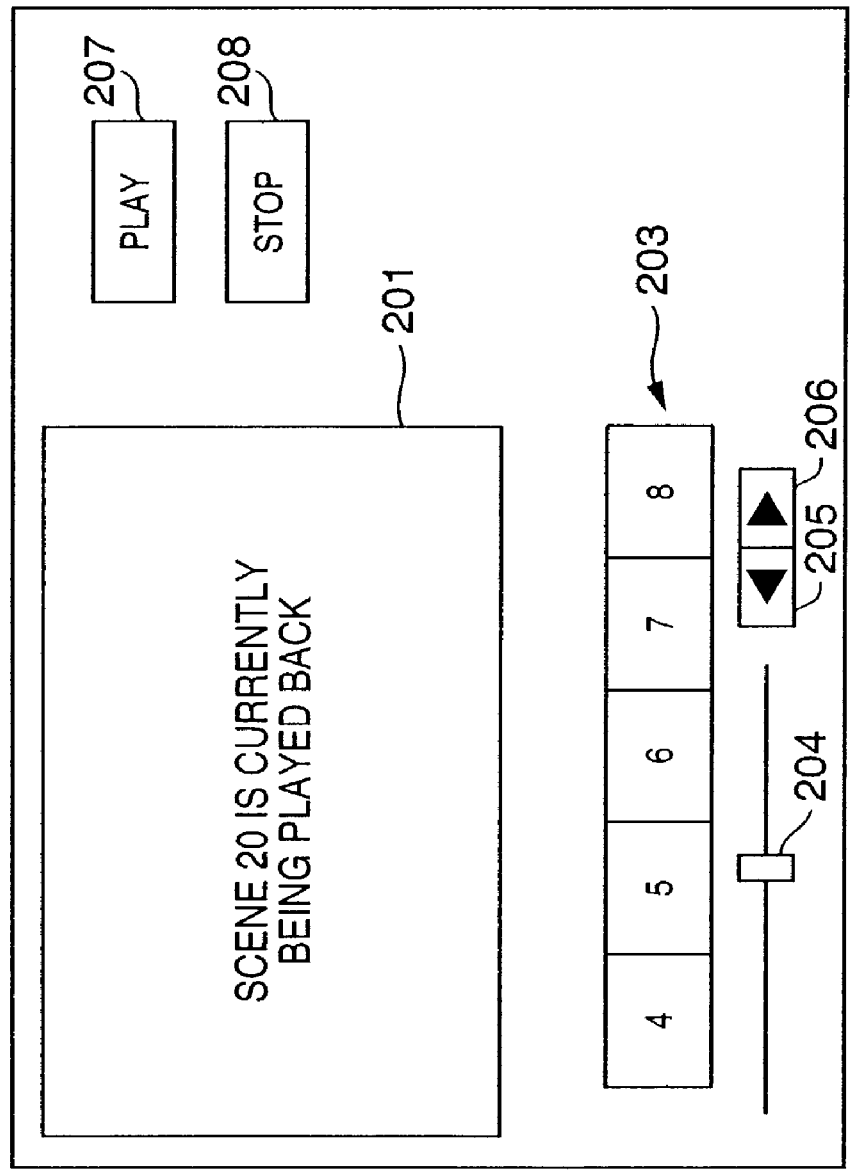
FIG. 10 shows an operation window upon scrolling the thumbnail image sequence during pursuit playback of the already recorded moving image in a second embodiment.

Since the hardware arrangement, functional arrangement, state transition, control sequence, and the like of the moving image search apparatus according to the second embodiment are the same as those of the first embodiment, description thereof will be omitted. However, in the synchronous display interrupt process in step S111, only the display form of the symbol 202 is changed, but no symbol 302 is displayed. FIGS. 9 and 10 show this state. FIG. 9 shows a case wherein a thumbnail image sequence has been scrolled during playback of already recorded moving image data, and FIG. 10 shows a case wherein a thumbnail image sequence has been scrolled during pursuit playback of moving image data, whose recording process is in progress. FIGS. 9 and 10 respectively correspond to FIGS. 3 and 5 of the first embodiment. The difference from FIGS. 3 and 5 is that no symbol 302 is displayed.

In step S113, whether or not the synchronous display restoration condition is met is checked. However, in the second embodiment, the time elapsed after the last scroll operation (the last operation of the scroll bar 204 or the scroll button 205 or 206) is measured, and when the elapsed time exceeds a predetermined time, it is determined that the user does not want to make scroll or scene jump operation, i.e., that the synchronous display restoration condition is met. Note that the predetermined time may be fixed or may be desirably set by the user.

Note that the synchronous display restoration condition is not limited to the aforementioned specific condition. For example, a predetermined area which includes the scroll bar 204 and the scroll buttons 205 and 206 may be defined, and when a state wherein the cursor falls outside this predetermined area continues for a predetermined period of time, it may be determined that the synchronous display restoration condition is met.

Third Embodiment

In the first and second embodiments, the automatic scroll process of the thumbnail image sequence 203 is controlled to locate a thumbnail image corresponding to a scene, which is displayed on the moving image playback area 201, at the center of the thumbnail image sequence 203 upon synchronous display of the thumbnail image sequence 203. Therefore, every time the scene currently being played back changes, the thumbnail image sequence 203 is scrolled, and the display contents of the thumbnail image sequence change frequently and are often not easily viewable. Hence, in the third embodiment, the frequency of occurrence of automatic scrolling of the thumbnail image sequence is reduced to make the thumbnail image sequence easily viewable.

The arrangement and control of the moving image search apparatus according to the third embodiment are the same as those of the first and second embodiments. However, a synchronous display method of the thumbnail image sequence upon playing back an already recorded moving image is different. This difference will be explained below.

Figure 11:
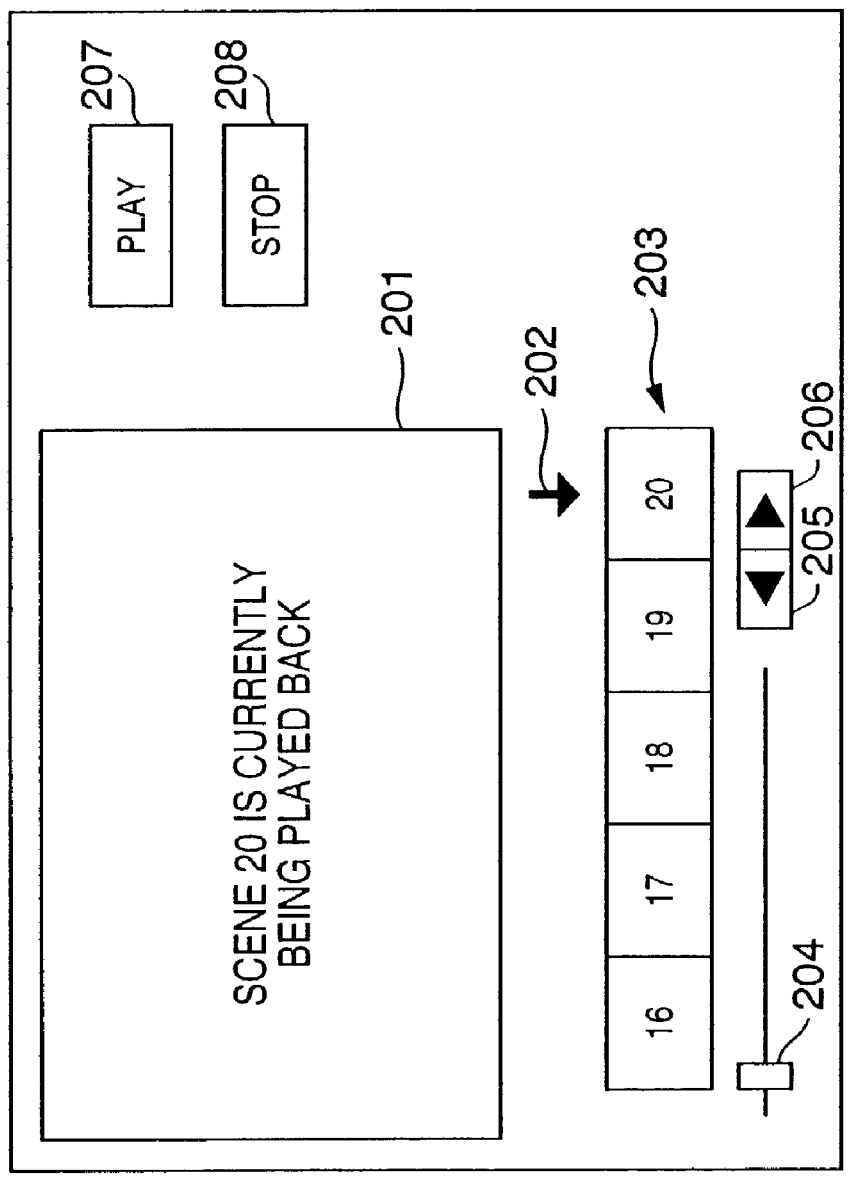
FIG. 11 shows the synchronous display state on a moving image playback area and thumbnail image sequence during playback of the already recorded moving image in a third embodiment.
Figure 12:
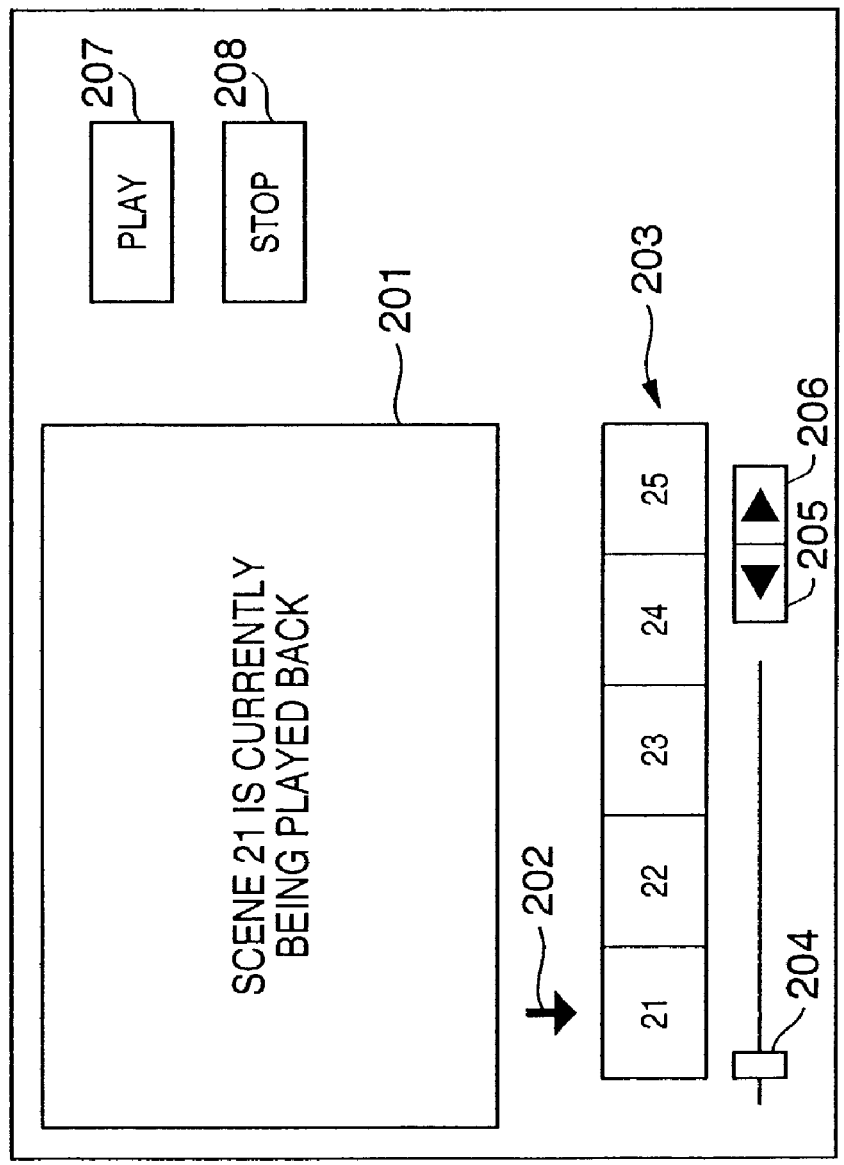
FIG. 12 shows the synchronous display state on the moving image playback area and thumbnail image sequence during playback of the already recorded moving image in the third embodiment.
Figure 13A:
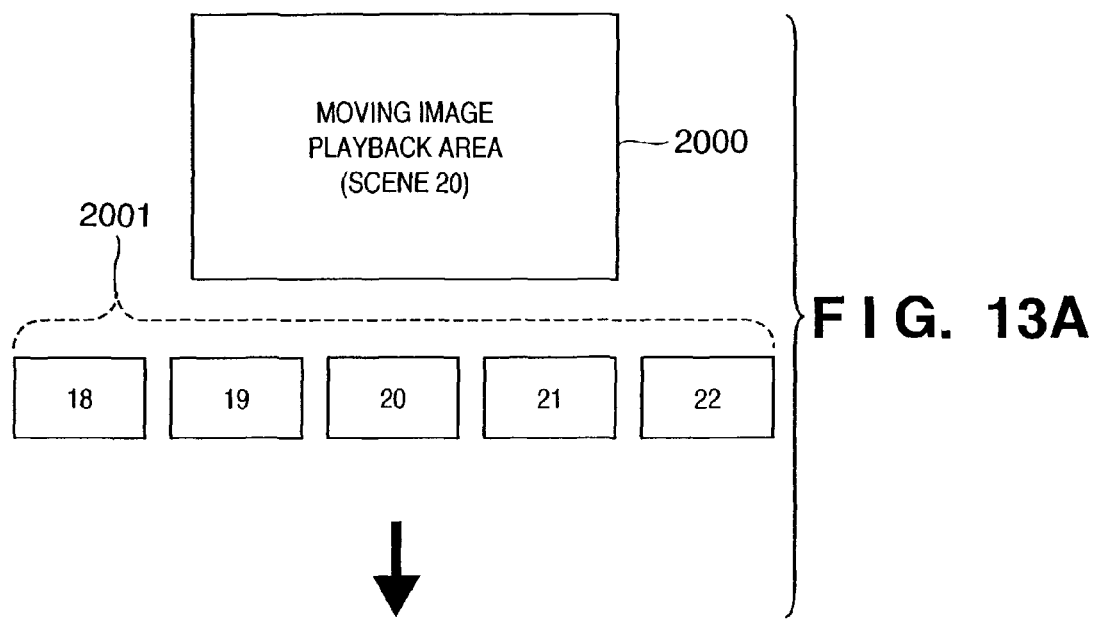
FIGS. 13A and 13B are views for explaining display on a moving image playback area and thumbnail image sequence.
Figure 13B:
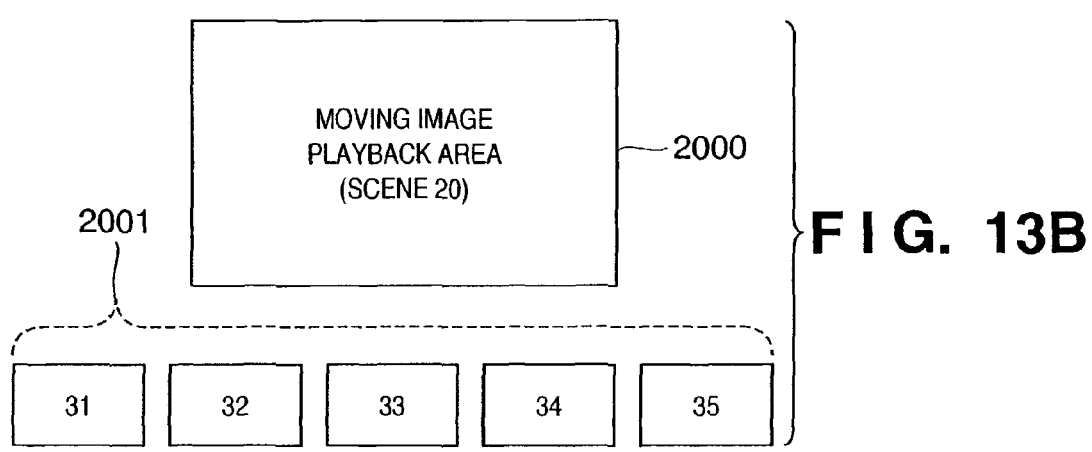

When an already recorded moving image is played back, and the thumbnail image sequence is displayed in synchronism with it, the thumbnail image sequence which includes a thumbnail image corresponding to a scene currently being played back on the moving image playback area 201 is displayed, and the symbol 202 is moved to the position of the corresponding thumbnail image in synchronism with a scene change along with the progress of moving image playback. FIGS. 11 and 12 are views for explaining synchronous display of the thumbnail image sequence according to the third embodiment. In FIG. 11, scene 20 is being played back, and the symbol 202 reaches the terminal end (the position of a thumbnail image corresponding to scene 20) of the thumbnail image sequence 203.

When the scene currently being played back changes to the next scene from this state, it is determined that the thumbnail image sequence 203 does not include the current scene, and the display contents of the thumbnail image sequence 203 is updated so that a thumbnail image corresponding to this scene (scene 21 in the example of FIG. 11) is located at the head of the thumbnail image sequence 203, thus obtaining a display state shown in FIG. 12. That is, thumbnail images corresponding to scenes 22 to 25 are displayed to have the thumbnail image corresponding to scene 21 as a start point. At this time, the symbol 202 corresponding to the scene currently being played back moves to the position of the start point (left end) of the thumbnail image sequence.

As described above, according to the third embodiment, the frequency of updating of the display contents of the thumbnail image sequence due to its automatic scrolling upon playing back the already recorded moving image can be lower than the first and second embodiments. Hence, the display contents of the thumbnail image sequence can be prevented from changing quickly, and the thumbnail image sequence becomes easily viewable.

In the third embodiment, synchronous display of the thumbnail image sequence is interrupted when the cursor has entered the predetermined area (706) including the thumbnail image sequence, as in the first and second embodiments. However, according to synchronous display of the thumbnail image sequence of the third embodiment, since the frequency of occurrence of automatic scrolling is reduced, designation errors of a thumbnail image can be eliminated to some extent. Hence, transit state 2 may be omitted to simplify the arrangement.

In the first and second embodiments, synchronous display is interrupted as soon as the cursor has entered the predetermined area. However, according to thumbnail image sequence display of the third embodiment, synchronous display may be continued until the symbol 202 reaches the terminal end of the thumbnail image sequence, even when the cursor has entered the predetermined area.

Note that the present invention may be applied to either a system constituted by a plurality of devices (e.g., a host computer, moving image player, and the like), or an apparatus consisting of a single equipment (e.g., a moving image player alone).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, a comfortable operation environment can be provided upon playing back a moving image.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A moving image playback apparatus comprising:
a playback unit constructed to play back a moving image one scene at a time in a moving image playback area;
a thumbnail image sequence display unit constructed to display, at the same time as the playback of the moving image by said playback unit, a plurality of thumbnail images respectively corresponding to a plurality of consecutive scenes of the moving image in a thumbnail image area;
a playback control unit constructed to control said playback unit to start the playback from a scene corresponding to a thumbnail image in the thumbnail image area that is designated;
a scroll unit constructed to scroll the thumbnail image area in synchronism with the playback of the moving image by said playback unit such that the plurality of thumbnail images includes a thumbnail image corresponding to the scene which is being displayed in the moving image playback area;
an inhibition unit constructed to inhibit the execution of said scroll unit while a cursor falls within a predetermined area in which a thumbnail image can be designated;
a restart control unit constructed to, when the cursor goes out of the predetermined area, restart the execution of said scroll unit; and
a symbol display unit constructed to display a symbol that points to the thumbnail image in the thumbnail image area which corresponds to the scene being displayed in the moving image playback area,
wherein said symbol display unit changes a display form of the symbol while the execution of said scroll unit is inhibited by said inhibition unit.

2. The moving image playback apparatus according to claim 1, wherein, when said playback control unit controls said playback unit to start the playback from a scene corresponding to a thumbnail image in the thumbnail image area that is designated, said restart control unit
restarts the execution of said scroll unit, and
moves the cursor outside the predetermined area.

3. The apparatus according to claim 1, wherein said playback unit continues to play back the moving image while said inhibition unit inhibits the execution of said scroll unit.

4. A moving image playback apparatus comprising:
a playback unit constructed to play back a moving image one scene at a time in a moving image playback area;
a thumbnail image sequence display unit constructed to display, at the same time as the playback of the moving image by said playback unit, a plurality of thumbnail images respectively corresponding to a plurality of consecutive scenes of the moving image in a thumbnail image area;
a playback control unit constructed to control said playback unit to start the playback from a scene corresponding to a thumbnail image in the thumbnail image area that is designated;
a scroll unit constructed to scroll the thumbnail image area in synchronism with the playback of the moving image by said playback unit such that the plurality of thumbnail images includes a thumbnail image corresponding to the scene which is being displayed in the moving image playback area;
an inhibition unit constructed to inhibit the execution of said scroll unit while a cursor falls within a predetermined area in which a thumbnail image can be designated; and a restart control unit constructed to, when the cursor goes out of the predetermined area, restart the execution of said scroll unit, wherein, when said playback control unit controls said playback unit to start the playback from a scene corresponding to a thumbnail image in the thumbnail image area that is designated, said restart control unit restarts the execution of the said scroll unit and moves the cursor outside the predetermined area.

5. The apparatus according to claim 4, wherein said playback unit continues to play back the moving image while said inhibition unit inhibits the execution of said scroll unit.

6. A moving image playback apparatus comprising:
a playback unit constructed to play back a moving image one scene at a time in a moving image playback area;
a thumbnail image sequence display unit constructed to display, at the same time as a playback of the moving image by said playback unit, a plurality of thumbnail images respectively corresponding to a plurality of consecutive scenes of the moving image in a thumbnail image area;
a first scroll unit constructed to scroll the thumbnail image area in synchronism with the playback of the moving image by said playback unit such that the plurality of thumbnail images includes a thumbnail image corresponding to a scene which is being displayed in the moving image playback area;
a playback control unit constructed to
control said playback unit to start the playback from a scene corresponding to a thumbnail image in the thumbnail image area that is designated, and
control said first scroll unit to scroll the thumbnail image area in synchronism with the playback of the moving image from the scene;
a second scroll unit constructed to, in accordance with a predetermined operation,
inhibit the execution of said first scroll unit, and
scroll the thumbnail image area in a time-axis direction; and
a restart control unit constructed to automatically restart the execution of said first scroll unit if the predetermined operation is not made again for a predetermined period of time.

7. The apparatus according to claim 6, further comprising:
a symbol display unit constructed to display a symbol which points to a thumbnail image in the thumbnail image area that corresponds to a scene being displayed in the moving image playback area,
wherein said symbol display unit changes a display form of the symbol while said second scroll unit inhibits the execution of said first scroll unit.

8. The apparatus according to claim 6, wherein said playback unit continues to play back the moving image while said second scroll unit inhibits the execution of said first scroll unit.

9. The apparatus according to claim 6, wherein, if said second scroll unit inhibits the execution of said first scroll unit, said restart control unit restarts the execution of said first scroll unit when detecting an operation for restarting the execution of said first scroll unit.

10. A moving image playback apparatus comprising:
a playback unit constructed to play back a moving image one scene at a time in a moving image playback area;
a thumbnail image sequence display unit constructed to display, at the same time as a playback of the moving image by said playback unit, a plurality of thumbnail images respectively corresponding to a plurality of consecutive scenes of the moving image in a thumbnail image area;
a first scroll unit constructed to scroll the thumbnail image area in synchronism with the playback of the moving image by said playback unit such that the plurality of thumbnail images includes a thumbnail image corresponding to a scene which is being displayed in the moving image playback area;
a playback control unit constructed to
control said playback unit to start the playback from a scene corresponding to a thumbnail image in the thumbnail image area that is designated, and
control said first scroll unit to scroll the thumbnail image area in synchronism with the playback of the moving image from the scene;
a second scroll unit constructed to, in accordance with a predetermined operation,
inhibit the execution of said first scroll unit, and
scroll the thumbnail image area in a time-axis direction; and
a restart control unit constructed to automatically restart the execution of said first scroll unit if a cursor continuously exists outside the thumbnail image area for predetermine time period.

11. The apparatus according to claim 10, further comprising:
a symbol display unit constructed to display a symbol which points to a thumbnail image in the thumbnail image area that corresponds to the scene being displayed in the moving image playback area,
wherein said symbol display unit changes a display form of the symbol while said second scroll unit inhibits the execution of said first scroll unit.

12. The apparatus according to claim 10, wherein said playback unit continues to play back the moving image while said second scroll unit inhibits the execution of said first scroll unit.

13. The apparatus according to claim 10, wherein if said second control unit inhibits the execution of said first scroll unit, said restart control unit restarts the execution of said first scroll unit when detecting an operation for restarting the execution of said first scroll unit.

14. A moving image playback method, comprising:
a playback step of playing back a moving image one scene at a time in a moving image playback area;
a thumbnail image sequence display step of displaying, at the same time as the playback of the moving image in said playback step, a plurality of thumbnail images respectively corresponding to a plurality of consecutive scenes of the moving image in a thumbnail image area;
a playback control step of controlling said playback step to including starting the playback from a scene corresponding to a thumbnail image in the thumbnail image area that is designated;
a scroll step of scrolling the thumbnail image area in synchronism with the playback of the moving image in said playback step such that the plurality of thumbnail images includes a thumbnail image corresponding to the scene which is being displayed in the moving image playback area;
an inhibition step of inhibiting the execution of said scroll step while a cursor falls within a predetermined area in which a thumbnail image can be designated;
a restart control step of, when the cursor goes out of the predetermined area, restarting the execution of said scroll step; and a symbol display step of displaying a symbol that points to the thumbnail image in the thumbnail image area which corresponds to the scene being displayed in the moving image playback area, wherein said symbol display step includes changing a display form of the symbol while the execution of said scroll step is inhibited in said inhibition step.

15. A non-transitory computer readable storage medium storing a program for causing a computer to execute the moving image playback method of claim 14.

16. A moving image playback method, comprising:
a playback step of playing back a moving image one scene at a time in a moving image playback area;
a thumbnail image sequence display step of displaying, at the same time as the playback of the moving image in said playback step, a plurality of thumbnail images respectively corresponding to a plurality of consecutive scenes of the moving image in a thumbnail image area;
a playback control step of controlling said playback step to include starting the playback from a scene corresponding to a thumbnail image in the thumbnail image area that is designated;
a scroll step of scrolling the thumbnail image area in synchronism with the playback of the moving image in said playback step such that the plurality of thumbnail images includes a thumbnail image corresponding to the scene which is being displayed in the moving image playback area;
an inhibition step of inhibiting the execution of said scroll step while a cursor falls within a predetermined area in which a thumbnail image can be designated; and
a restart control step of, when the cursor goes out of the predetermined area, restarting the execution of said scroll step,
wherein, when in said playback control step, said playback step is controlled to include starting from a scene corresponding to a thumbnail image in the thumbnail image area that is designated, said restart control unit
restarts the execution of the said scroll unit, and
moves the cursor outside the predetermined area.

17. A non-transitory computer readable storage medium storing a program for causing a computer to execute the moving image playback method of claim 16.

18. A moving image playback method, comprising:
a playback step of playing back a moving image one scene at a time in a moving image playback area;
a thumbnail image sequence display step of displaying, at the same time as a playback of the moving image in said playback step, a plurality of thumbnail images respectively corresponding to a plurality of consecutive scenes of the moving image in a thumbnail image area;
a first scroll step of scrolling the thumbnail image area in synchronism with the playback of the moving image in said playback step such that the plurality of thumbnail images includes a thumbnail image corresponding to a scene which is being displayed in the moving image playback area;
a playback control step of
controlling said playback step to include starting from a scene corresponding to a thumbnail image in the thumbnail image area that is designated, and
controlling the scrolling of the thumbnail image area in said first scroll step be in synchronism with the playback of the moving image from the scene;
a second scroll step of, in accordance with a predetermined operation,
inhibiting the execution of said first scroll step, and
scrolling the thumbnail image area in a time-axis direction; and
a restart control step of automatically restarting the execution of said first scroll step if the predetermined operation is not made again for a predetermined period of time.

19. A non-transitory computer readable storage medium storing a program for causing a computer to execute the moving image playback method of claim 18.

20. A moving image playback method, comprising:
a playback step of playing back a moving image one scene at a time in a moving image playback area;
a thumbnail image sequence display step of displaying, at the same time as a playback of the moving image in said playback step, a plurality of thumbnail images respectively corresponding to a plurality of consecutive scenes of the moving image in a thumbnail image area;
a first scroll step of scrolling the thumbnail image area in synchronism with the playback of the moving image in said playback step such that the plurality of thumbnail images includes a thumbnail image corresponding to a scene which is being displayed in the moving image playback area;
a playback control step of
controlling said playback step to include starting from a scene corresponding to a thumbnail image in the thumbnail image area that is designated, and
controlling the scrolling of the thumbnail image area in said first scroll step be in synchronism with the playback of the moving image from the scene;
a second scroll step of, in accordance with a predetermined operation,
inhibiting the execution of said first scroll step, and
scrolling the thumbnail image area in a time-axis direction; and
a restart control step of automatically restarting the execution of said first scroll step if a cursor continuously exists outside the thumbnail image area for predetermine time period.

21. A non-transitory computer readable storage medium storing a program for causing a computer to execute the moving image playback method of claim 20.

* * * * *